(12) United States Patent
Cakici et al.

(10) Patent No.: US 11,686,331 B2
(45) Date of Patent: Jun. 27, 2023

(54) LOAD CARRIER COUPLING

(71) Applicant: WESTFALIA-AUTOMOTIVE GMBH, Rheda-Wiedenbrück (DE)

(72) Inventors: Hakan Cakici, Gütersloh (DE); Martin Düker, Gütersloh (DE); Stefan Röring, Bielefeld (DE)

(73) Assignee: WESTFALIA-AUTOMOTIVE GMBH

( * ) Notice: Subject to any disclaimer, the term of this patent is extended or adjusted under 35 U.S.C. 154(b) by 1385 days.

(21) Appl. No.: 16/069,638

(22) PCT Filed: Jan. 31, 2017

(86) PCT No.: PCT/EP2017/052032
§ 371 (c)(1),
(2) Date: Jul. 12, 2018

(87) PCT Pub. No.: WO2017/140492
PCT Pub. Date: Aug. 24, 2017

(65) Prior Publication Data
US 2019/0017525 A1    Jan. 17, 2019

(30) Foreign Application Priority Data

Feb. 17, 2016   (DE) .......................... 102016102812.6
Feb. 29, 2016   (DE) .......................... 102016103596.3

(51) Int. Cl.
*B60R 9/06* (2006.01)
*F16B 2/18* (2006.01)
*B60R 9/10* (2006.01)

(52) U.S. Cl.
CPC ................ *F16B 2/185* (2013.01); *B60R 9/06* (2013.01); *B60R 9/10* (2013.01)

(58) Field of Classification Search
CPC .............. B60R 9/06; B60R 9/10; F16B 2/185
(Continued)

(56) References Cited

U.S. PATENT DOCUMENTS 3,858,775 A * 1/1975 Haas .......................... B60R 9/10
224/520
4,412,635 A * 11/1983 Bateman ................... B60R 9/06
224/523
(Continued)

FOREIGN PATENT DOCUMENTS

CN    101678792 A    3/2010
CN    102300747 A    12/2011
(Continued)

OTHER PUBLICATIONS

Australian Examination Report dated Jun. 2, 2021; Australian Application No. 2017219550 filed on Feb. 17, 2016.
(Continued)

*Primary Examiner* — Peter N Helvey
(74) *Attorney, Agent, or Firm* — McDonald Hopkins LLC

(57) ABSTRACT

The invention relates to a load carrier coupling (10) for the releasable securing of a rear load carrier (9), which has a supporting base (80) for placing a load thereon, on a coupling body (93), configured in particular as a coupling ball, of a motor vehicle trailer coupling (90), wherein the load carrier coupling (10) has a base (11) which forms the supporting base (80) or is provided for holding the supporting base (80), wherein a clamping device (30) comprising two clamping parts (31, 32) is arranged on the base (11) and is adjustable by an actuating device (40) between an open position (O) provided for inserting the coupling body (93) into an intermediate space between the clamping parts (31, 32) and for removing the coupling body (93) from the intermediate space and a clamping position (K) provided for clamping the coupling body (93), wherein the clamping parts (31, 32) are at a greater distance from each other in the open position (O) for the insertion and removal of the coupling body (93) than in the clamping position (K). At least one of the clamping parts (32) is mounted movably (Continued)

Figure 1:
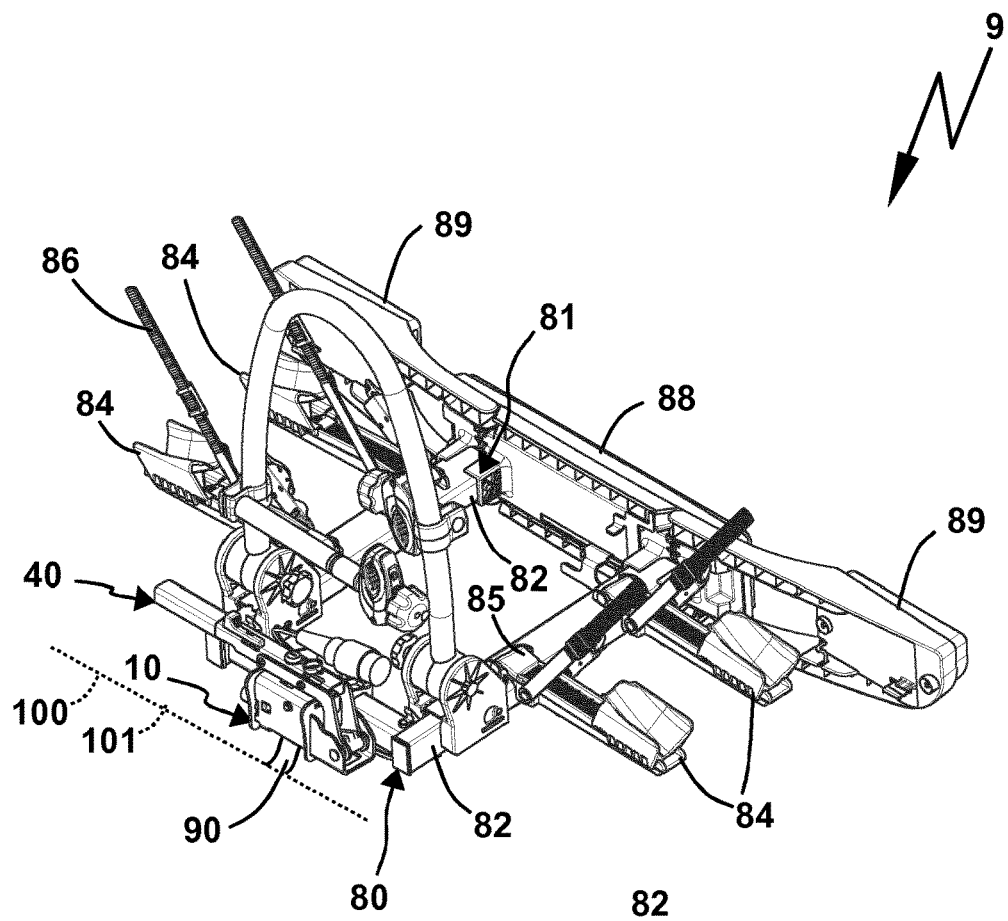

with respect to a stop surface (65) using a bearing arrangement (70) having at least two degrees of freedom of movement (S2, S3, S4) which differ from one another, and therefore said clamping part is adjustable by the coupling body (93), which is supported on the other clamping part (31), for alignment with the coupling body (93) during a final portion of movement of the clamping device (30) in order to take up the clamping position (K) with respect to the stop surface (65).

28 Claims, 5 Drawing Sheets

(58) Field of Classification Search
USPC .................................................... 403/322.4
See application file for complete search history.

(56) References Cited

U.S. PATENT DOCUMENTS

| | | | | |
|---|---|---|---|---|
| 5,228,607 | A | * | 7/1993 | Tolsdorf .................. B60R 9/06 224/520 |
| 5,388,736 | A | * | 2/1995 | Schmidt .................. B60R 9/12 224/520 |
| 5,549,230 | A | * | 8/1996 | Palmen .................... B60R 9/06 224/511 |
| 5,950,892 | A | * | 9/1999 | Tsai ......................... B60R 9/10 224/520 |
| 2007/0012634 | A1 | * | 1/2007 | Huang ..................... B60R 9/10 211/17 |
| 2009/0095782 | A1 | * | 4/2009 | Liu .......................... B60R 9/10 224/502 |
| 2010/0019122 | A1 | * | 1/2010 | Barrett ..................... B60R 9/06 248/689 |
| 2011/0049208 | A1 | * | 3/2011 | Wang ....................... B60R 9/10 224/520 |
| 2019/0144096 | A1 | * | 5/2019 | McClung .............. F16B 5/0614 403/322.4 |
| 2020/0307754 | A1 | * | 10/2020 | McClung ................ B63B 32/66 |
| 2020/0369216 | A1 | * | 11/2020 | Almhill .................... B60D 1/06 |
| 2022/0161735 | A1 | * | 5/2022 | Mannsfeld .............. E04H 15/06 |

FOREIGN PATENT DOCUMENTS

| | | |
|---|---|---|
| CN | 104703842 A | 6/2015 |
| DE | 9404236 | 5/1994 |
| DE | 102004030082 | 1/2006 |
| DE | 202006012073 | 9/2006 |
| DE | 102006013465 A1 | 9/2007 |
| DE | 102008047110 | 4/2010 |
| DE | 202011051091 | 11/2011 |
| DE | 102010045357 A1 | 3/2012 |
| DE | 202014105324 | 11/2014 |
| EP | 2163432 B1 | 11/2011 |
| EP | 2428402 A1 | 3/2012 |
| EP | 2460692 A2 | 6/2012 |
| EP | 2774785 A | 9/2014 |
| EP | 2774785 A1 | 9/2014 |
| NL | 9301797 A | 5/1995 |
| WO | WO2014/209207 | 12/2014 |

OTHER PUBLICATIONS

Chinese Office Action dated Apr. 26, 2021; Chinese Patent Application No. 201780012139.X filed on Jan. 31, 2017.
Translation of International Search Report dated Mar. 3, 2017; International Application No. PCT/EP2017/052032 filed Jan. 31, 2017; ISA/NL.

* cited by examiner

LOAD CARRIER COUPLING

CROSS-REFERENCE TO RELATED APPLICATION

This application is a 35 U.S.C. § 371 national stage application of PCT Application No. PCT/EP2017/052032 filed on Jan. 31, 2017, entitled "LOAD CARRIER COUPLING," which claims priority to German Patent Application No. 102016102812.6, filed on Feb. 17, 2016, and German Patent Application No. 102016103596.3, filed on Feb. 29, 2016, each of which are incorporated herein in their entirety by reference.

The invention relates to a load carrier coupling for the releasable securing of a rear load carrier, which has a supporting base for placing a load thereon, on a coupling body configured in particular as a coupling ball, of a motor vehicle trailer coupling, wherein the load carrier coupling has a base, which forms the supporting base or is provided for holding the supporting base, wherein a clamping device comprising two clamping parts is arranged on the base and is adjustable by an actuating device between an open position provided for inserting the coupling body in an intermediate space between the clamping parts and for removing the coupling body from the intermediate space and a clamping position provided for the clamping the coupling body, wherein the clamping parts are at a greater distance from each other in the open position for the insertion and removal of the coupling body than in the clamping position.

Such a load carrier coupling is, by way of example, described in DE 10 2010 045 357 A1. Here, one clamping part is formed by the base of the load carrier coupling, whereas the other clamping part is adjustable using the actuating device, which comprises an actuating lever, relative to the clamping part that is stationary on the base. By means of an adjusting device, in particular a screw, the movable clamping part can be adjusted in relation to the other clamping part, so that in the clamping position of the coupling body, in particular a coupling ball, secure clamping can be achieved. In practice, however, the problem arises that the clamping parts, even when the adjusting device has been adjusted, do not always have an optimum fit on the coupling ball.

The problem for the present invention was therefore to provide an improved load carrier coupling.

To solve the problem, on a load carrier coupling of the abovementioned type, it is provided that at least one of the clamping parts is mounted movably with respect to a stop surface using a bearing arrangement having at least two degrees of freedom of movement which differ from one another, and therefore said clamping part is adjustable by the coupling body, which is supported on the other clamping part, for alignment with the coupling body during a final portion of movement of the clamping device in order to take up the clamping position with respect to the at least one stop surface.

The fundamental idea here, is that at least one of the clamping parts is, as it were, mounted floatingly by means of the bearing arrangement, so that the clamping body can bring this clamping part into suitable alignment with respect to the stop surface, in which the clamping surfaces of the clamping body have an optimum fit on the coupling body, by way of example spherical ball-shaped clamping surfaces on a coupling body configured as a coupling ball.

The movement play of the clamping part in relation to the at least one stop surface, therefore expediently serves not to move the clamping part between the open position and the clamping position but for alignment of clamping part relative to the coupling body.

A travel provided for one clamping part for adjustment between the open position and the clamping position, is expediently not a component of the movement of the clamping part during the alignment in relation to the coupling body and the at least one stop surface, or at most only a small percentage or a maximum of 10% of this.

It is expedient if the adjusting movement of the clamping part relative to the stop surface during the final portion of movement of the clamping device is within a range of approximately 1% to 5%, with a maximum of 10%, of the travel, which the clamping part movable by means of the bearing arrangement or the clamping part opposing this clamping part performs during the adjustment of the clamping device between the open position and the clamping position with respect to stop surface.

An advantageous effect is, by way of example, that through the optimum fit of the at least one clamping part or as far as possible both clamping parts on the coupling body, a good retention of the load carrier coupling on the trailer coupling is achieved. It is also expedient if, in line with the invention, low play of the clamping parts and the coupling body relative to one another and/or a large-area fit with one another can be achieved to reduce wear. In particular, there are no or minimal concerns about damage to the trailer coupling and its coupling body.

In a load carrier coupling according to the invention or also according to the preamble to claim 1 it is also advantageously provided that at least one of the clamping parts is mounted movably in the clamping position of the clamping device using a bearing arrangement having at least two degrees of freedom of movement which differ from one another with respect to a stop surface provided in particular on an adjustable stop element, so that it is adjustable by the coupling body supported on the other clamping part relative to the stop element.

It is possible that the at least one stop surface comprises one or more stationary stop surfaces. The at least one stop surface can, by way of example, be provided in a stationary manner on the base, by way of example on a base housing. A stop surface, by way of example, on an operating lever or a force transmission element of the actuating device for actuating a clamping part is also possible.

The at least one stop surface preferably is or comprises at least one movable or adjustable stop surface. It is worth noting at this point that one or more stop surfaces may be present.

It is preferably provided that the at least one stop surface comprises or is formed by a stop surface arranged on an adjustable stop element for setting a distance between the clamping parts in the clamping position. The stop element comprises, by way of example, an adjusting screw or other adjusting contour which, by way of example, is arranged on the base of the load carrier coupling or also on the actuating device or a drive gearbox between the actuating device and the clamping part operable by the actuating device. By way of example, the stop element is screwed into a screw seat on the base. It is also possible for a stop element, by way of example, to be clampable or inter-lockable in various positions to or with the base or a force transmission element of the actuating device, so that a position of the stop surface provided by the stop element relative to the base or force transmission element can be set.

In principle, it is possible for just one of the clamping parts in line with the invention to be mounted movably with two or more degrees of freedom of movement for alignment by, and/or on, the coupling body of the trailer coupling, while the other clamping part, by way of example, is arranged in a stationary manner on the base or is adjustable by the actuating device between the clamping position and the open position but has no such suitable movement play for alignment on the coupling body.

It is also possible for both clamping parts in line with the invention to have a movement play, that is to say in relation to the at least one stop surface at least two degrees of freedom of movement by means of the bearing arrangement, so that each of the clamping parts can be aligned shortly before reaching the clamping position by the coupling body, in particular the coupling ball of the trailer coupling.

It is advantageously provided that the bearing arrangement and the at least one stop surface as well as the clamping part mounted using the bearing arrangement are arranged on the base and the other clamping part is adjustable via the actuating device between the clamping position and the open position.

Preference is for a configuration in which the clamping part operable by the actuating device has only the movability, by way of example a rotating support rotatable with respect to base, necessary for it to be operable between the clamping position and the open position. The other clamping part is mounted movably using the bearing arrangement with respect to base of the load carrier coupling but cannot be adjusted by the actuating device between the open position and the clamping position.

It is possible, however, for the actuating device to be provided for adjustment of both clamping parts between the clamping position and the open position. By way of example, the clamping parts can be operable in the manner of a clasp or scissors by the actuating device away from one another in the open position and towards one another in the clamping position.

The at least two degrees of freedom of movement can comprise various degrees of freedom of movement.

Thus, it is preferably provided that these comprise at least two degrees of freedom of translation along translation axes at an angle to one another, in particular at a right-angle. Preference is for a movability or translational mobility in three directions or along three translation axes. By way of example, the clamping part, using the bearing arrangement, may be movable along three axes each at right-angles to one another or cartesian axes.

Furthermore, at least two degrees of freedom of rotation may also be provided, meaning that the clamping part, by way of example, is mounted using the bearing arrangement so that it can swivel about two axes of rotation.

It is advantageously provided that the at least two degrees of freedom of movement comprise at least one degree of freedom of translation and at least one degree of freedom of rotation. It is possible that this degree of freedom of translation and the degree of freedom of rotation relate to one and the same axis, i.e. the swivelling and translational adjustment or displacement of the clamping part take place in relation to the same axis.

It is preferable if the clamping part supported on the at least one stop surface using the bearing arrangement is mounted to swivel about a swivel axis and to slide along a sliding axis. The sliding axis and the swivel axis are, for example, coaxial or at an angle to one another.

One configuration provides, by way of example, that the bearing arrangement comprises a swivel bearing and sliding bearing, or a combined swivel and sliding bearing, using which the at least one clamping part can be swivelled about a swivel axis running through a swivel axis part. The swivel axis part itself can in turn be slid along a sliding axis into a bearing seat. The sliding axis runs transversally, in particular approximately at right-angles or exactly at right-angles to the swivel axis. Consequently, the clamping part can, by way of example, be slid with the swivel axis part along the bearing seat.

It is expediently provided that the at least one stop surface comprises a bearing surface arranged on a bearing seat of the bearing arrangement. By way of example, a bearing bolt or a bearing axis of the bearing arrangement is rotatably and movably mounted in the bearing. In the clamping position, the bearing bolt or the bearing axis is supported by the bearing seat.

It is, furthermore, possible for the clamping part to be rotatable and/or slidable in relation to the bearing bolt. Thus, by way of example, a further degree of freedom of movement can be achieved. It is also possible, however, for the at least two degrees of freedom of movement to be achieved in that the clamping part is slidably and rotatably mounted on a bearing bolt.

The at least one bearing surface comprises, by way of example, a slotted hole or is arranged in a slotted hole.

It is advantageous if at least one of the clamping parts, in particular the one that cannot be aligned with respect to the stop surface, is operable by the actuating device and is mounted so that it can be swivelled about a swivel axis between the open position and the clamping position of the clamping device. The swivel axis is, by way of example, stationary with respect to base of the load carrier coupling, in particular with respect to a base housing of the load carrier coupling.

It is worth noting at this point that it is also perfectly possible for the actuating device to adjust a clamping part between the open position and the clamping position of the clamping device for example by translation or a combination of translation and rotation. By way of example, it is also possible for the clamping part to be operable by the actuating device along a curve between the open position and the clamping position, for example using a suitable cam control. Thus, the load carrier coupling in this case comprises a cam control. A suitable embodiment is, by way of example, described in the abovementioned DE 10 2010 045 357 A1.

An advantageous embodiment provides that a swivel axis of the bearing arrangement, can swivel about the clamping part able to swivel with respect to the stop surface, at an angle, by way of example at a right-angle or approximately at a right-angle, to a swivel axis, about which the other clamping part is able to swivel between the open position and the clamping position of the clamping device. Thus, one clamping part swivels between the open position and the closed position, by way of example about a swivel axis that is approximately horizontal when the load carrier coupling is in use, whereas the other clamping part, which is aligned by the coupling body with respect to at least one stop surface, swivels about an approximately vertical swivel axis. In this way, a particularly favourable positioning of the coupling body between the clamping parts is possible. However, in principle, it is also possible for the swivel axes of the two clamping parts to run parallel to one another, by way of example approximately horizontally when the load carrier coupling is in use. By way of example, in this case the swivel axes are advantageously arranged in an upper area of the base of the load carrier coupling when in use.

It is advantageous if the actuating device has a top dead centre gear. Preference is, by way of example, for a linkage arrangement as a component of an actuating device.

The actuating device expediently comprises at least one actuating lever. By way of example, the actuating lever has an actuating arm.

A linkage arrangement or other force transmission gear can expediently, for the purposes of intensification of the force of a hand grip of the actuating device, impinge on the clamping part actuated by the actuating device.

An invention in itself independent of the preamble to claim 1, but also an advantageous form of the invention, involves the load carrier coupling having an actuating device having a linkage arrangement, which holds at least one clamping part in the clamping position in a top dead centre position, wherein the linkage arrangement has at least one top dead centre stop, in particular in the form of an axis element, which a movable limit stop projection of a link element of the linkage arrangement in the top dead centre position strikes during adjustment of the clamping part from the open position into the clamping position. The fundamental idea here is, as it were, that the top dead centre stop is created in the linkage arrangement itself. In this way, the linkage arrangement can be produced with very high precision.

It is expediently provided that at least one clamping part, advantageously both clamping parts, has or have a form-fitting seat for form-fit seating of the coupling body. Thus, the form-fit seat preferably has an inner contour that matches an outer contour of the coupling body. It is worth mentioning at this point that the coupling body expediently and generally comprises or if formed by a coupling ball. Accordingly, then, the form-fitting seat is at least partially spherical or has an internal surface that corresponds to a spherical surface of a hollow sphere.

It is basically also possible, however, for the coupling body to have another geometry, by way of example polygonal, in particular cuboid. In this case, a form-fitting seat on at least one of the clamping parts is similarly advantageous. So, this is a direct materialisation of the concept according to the invention, of the coupling body, as it were, fitting into the seating contour of the form-fitting seat of the clamping part, as it were, in that it adjusts the clamping part in order to take up the clamping position or upon taking up the clamping position in relation to the at least one stop or the at least one stop surface.

Advantageously, the at least one clamping part has a spherical ball-shaped clamping surface. The clamping surface can, by way of example, be configured as a circular clamping surface. The clamping surface is extended, by way of example, by a recess, in which the coupling body is inserted. In the recess itself, the coupling body advantageously has no support. Thus, by way of example, an apex of the coupling body or the coupling ball is not supported, whereas a circular cone surface extending around the apex of the coupling body is.

An expedient form of the invention provides that a clamping surface of the clamping part alignable by the coupling body is arranged between the bearing arrangement and the at least one stop surface. By way of example, this at least one stop surface is an adjustable stop surface or is arranged on one of the abovementioned stop elements, which is adjustable relative for example to the force transmission element of the actuating device or the base of the load carrier coupling.

It is advantageous if on an opposing side of the clamping part alignable by the coupling body the at least one stop surface, in particular a stop element or adjusting element, and the bearing arrangement are arranged.

In a manner favourable to ease of assembly, the base of the load carrier coupling comprises a base housing which is formed using stamped and bent parts or stamped parts.

The at least one clamping part adjustable with respect to the at least one stop surface is expediently mounted using the bearing arrangement so that it can float on the base or the actuating device. Through this floating mounting, various degrees of freedom of movement are possible, by way of example along two or three movement axes.

The at least one clamping part alignable by the coupling body is expediently mounted on an opposing side of its clamping surface with respect to the base of the load carrier coupling. By way of example, on one side a swivel bearing is provided, while on the other side a sliding bearing is provided, having a relatively large amount of play.

It is also advantageous if the clamping part alignable by the coupling body is mounted movably by the bearing arrangement, by way of example on the base or the actuating device, away from the bearing arrangement in engagement with the base or the actuating device, so that it is captive with respect to the base or the actuating device. By way of example, a retaining projection or a lug engages in a corresponding recess in the base or the actuating device. Thus, by way of example, the clamping part is able to swivel about a swivel axis, wherein it is nevertheless held radially distant from the swivel axis by the abovementioned seat on the base or the actuating device.

Figure 2:
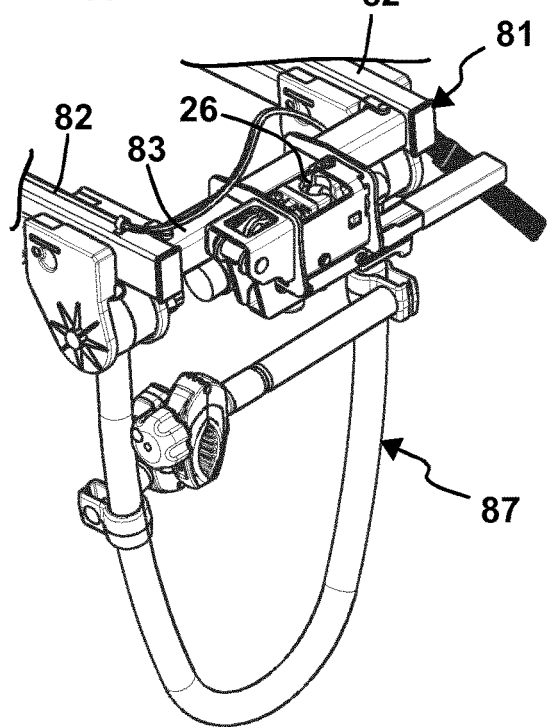
Figure 3:
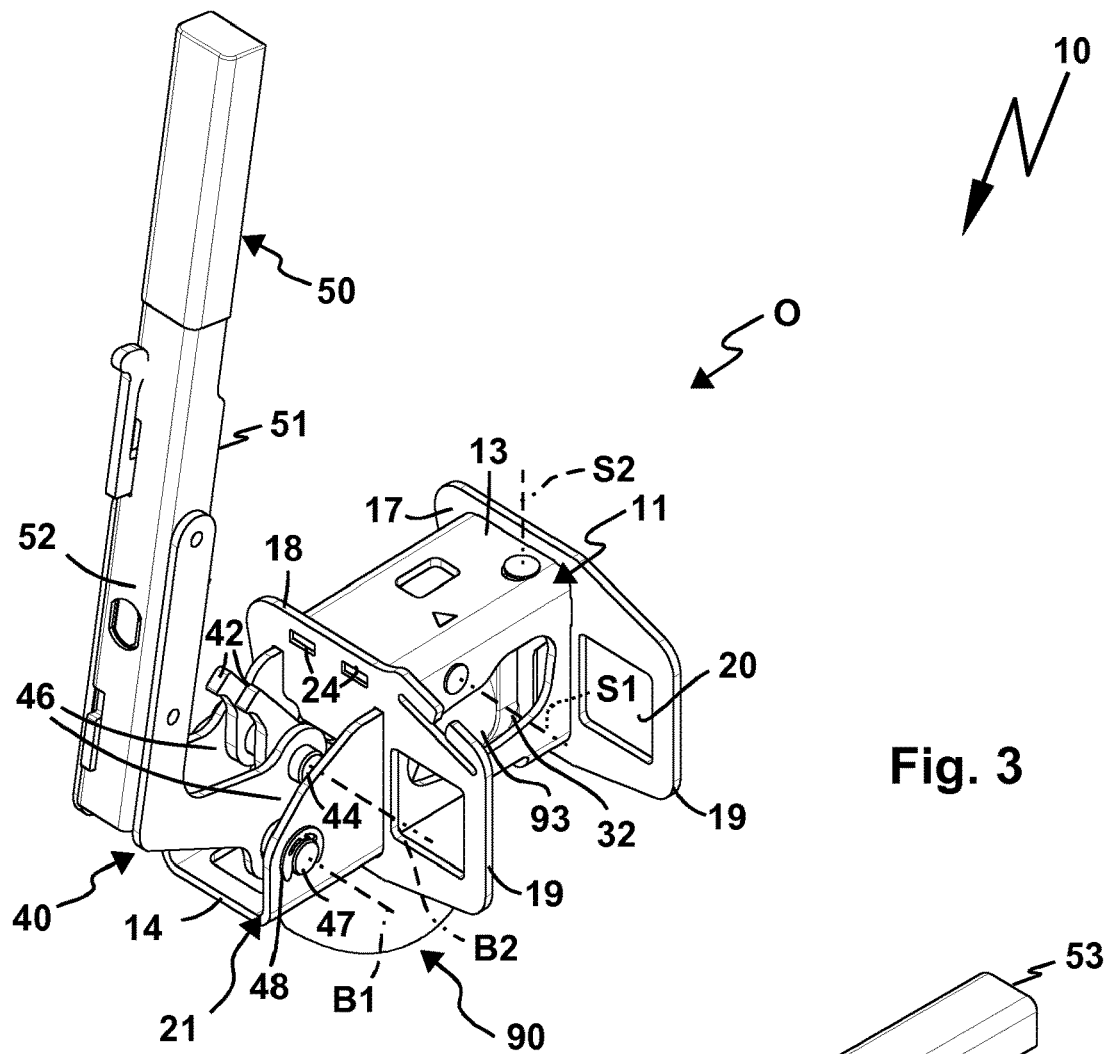
Figure 4:
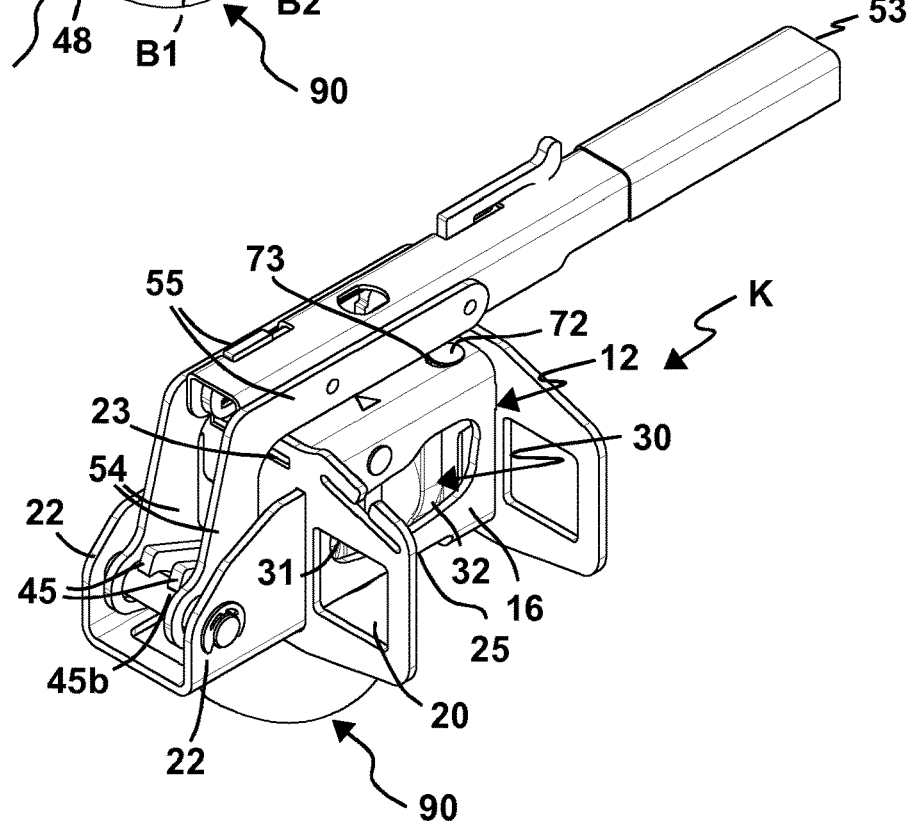
Figure 5:
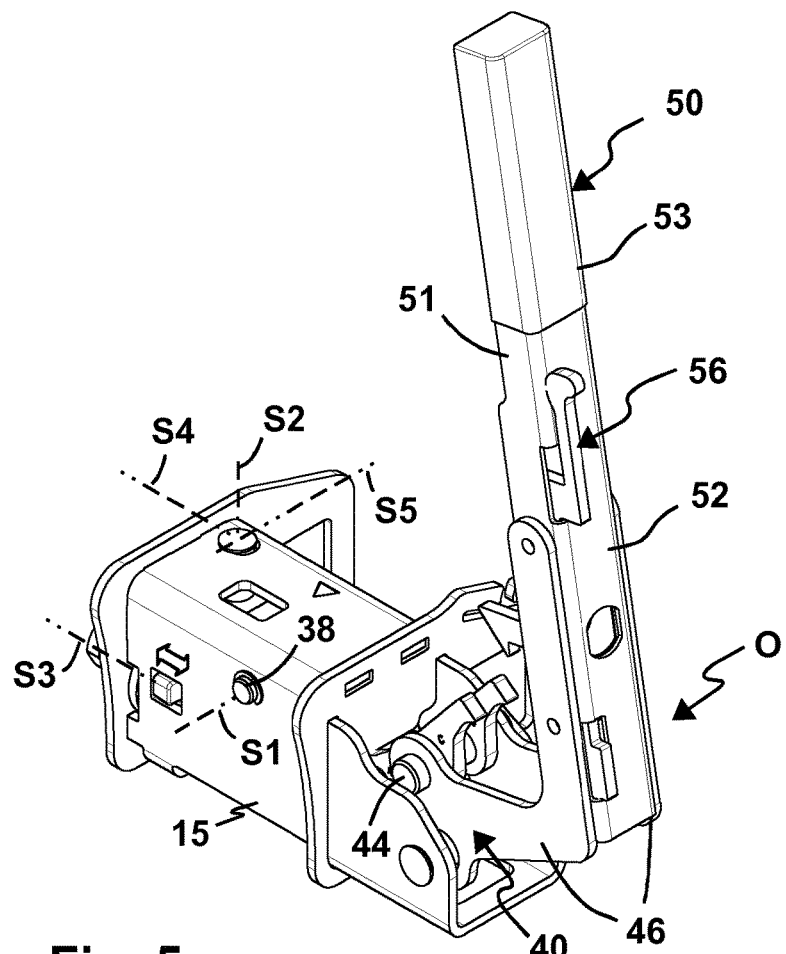
Figure 6:
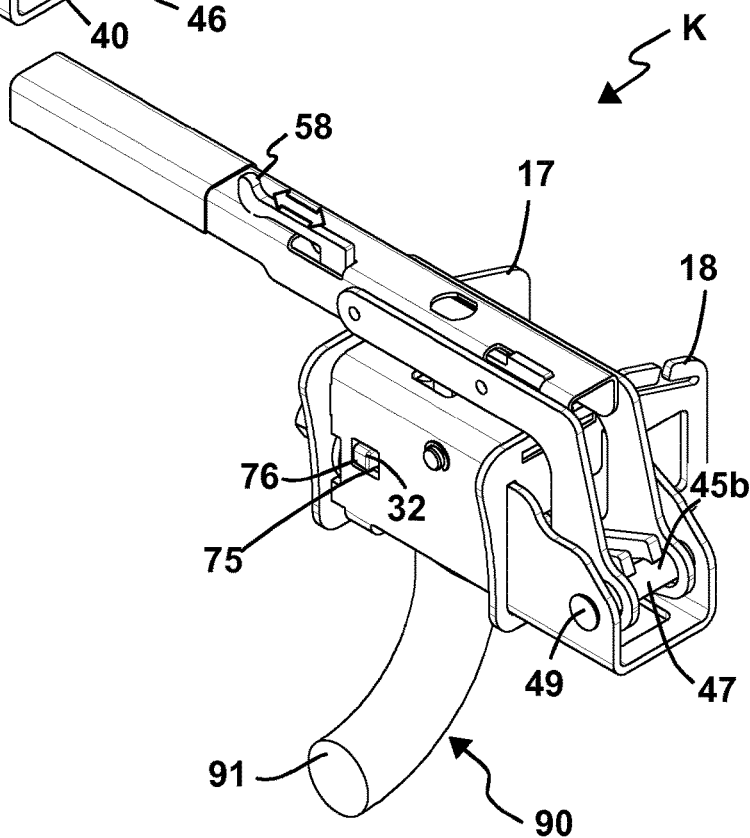
Figure 7:
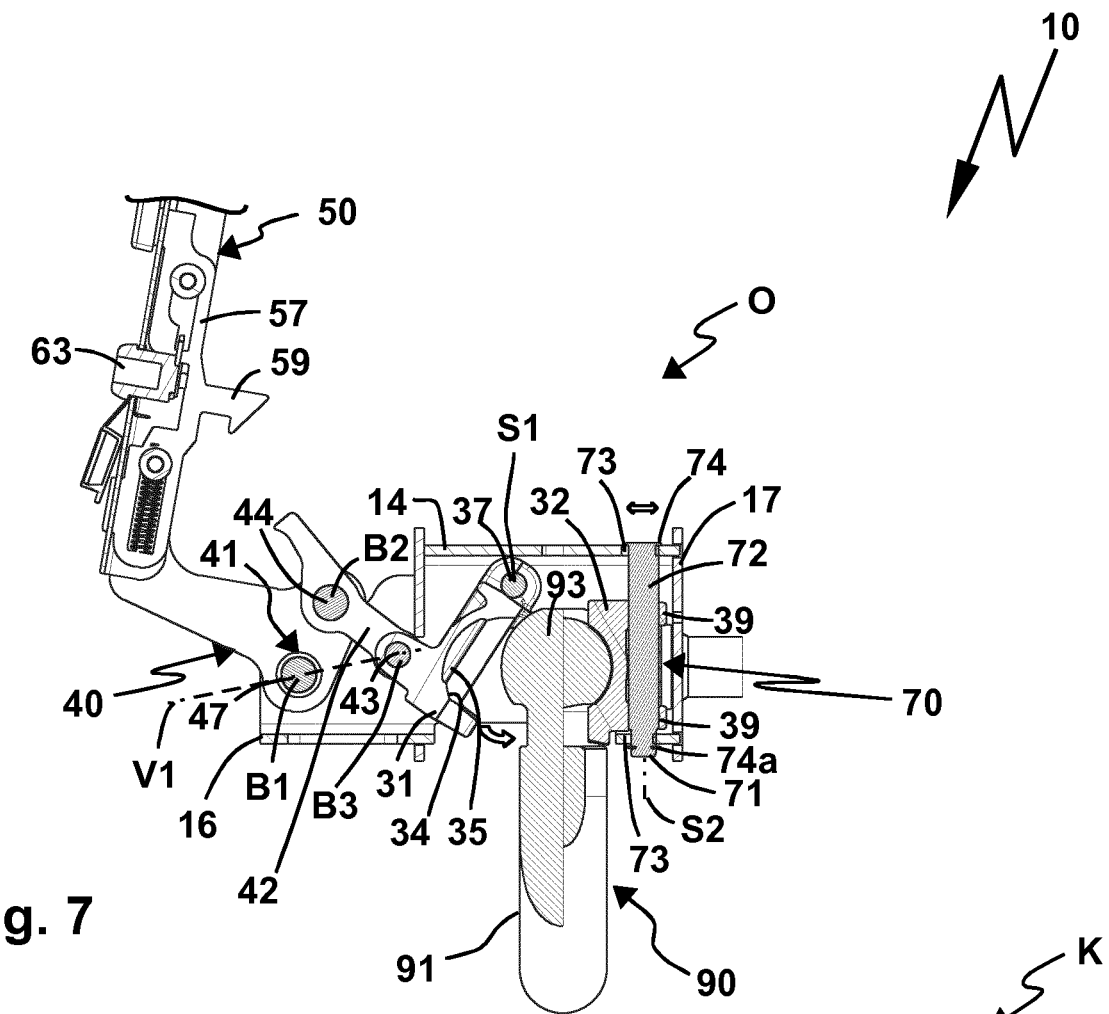
Figure 8:
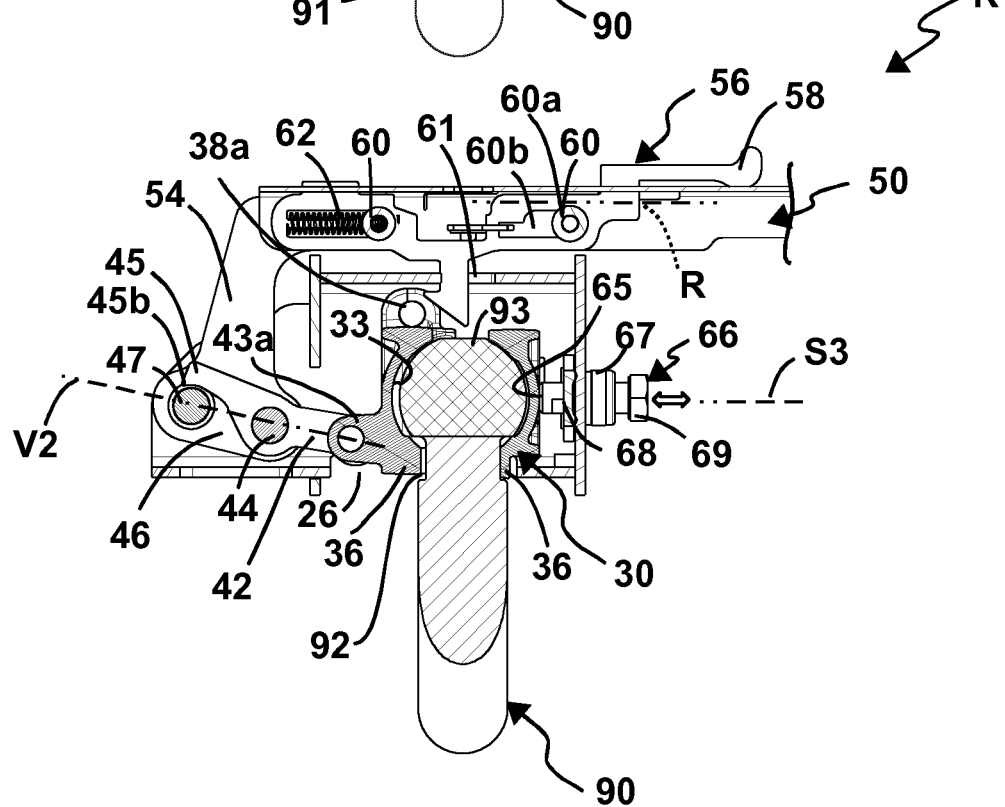
Figure 9:
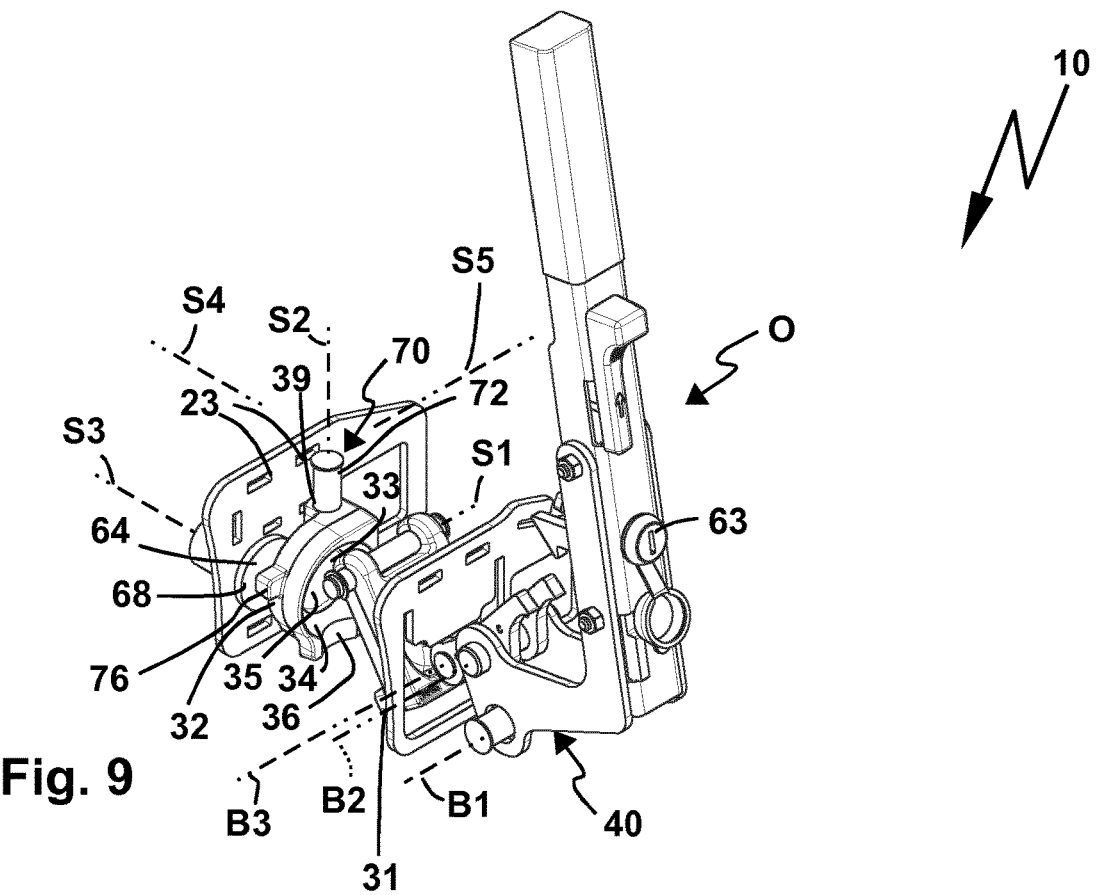
Figure 10:
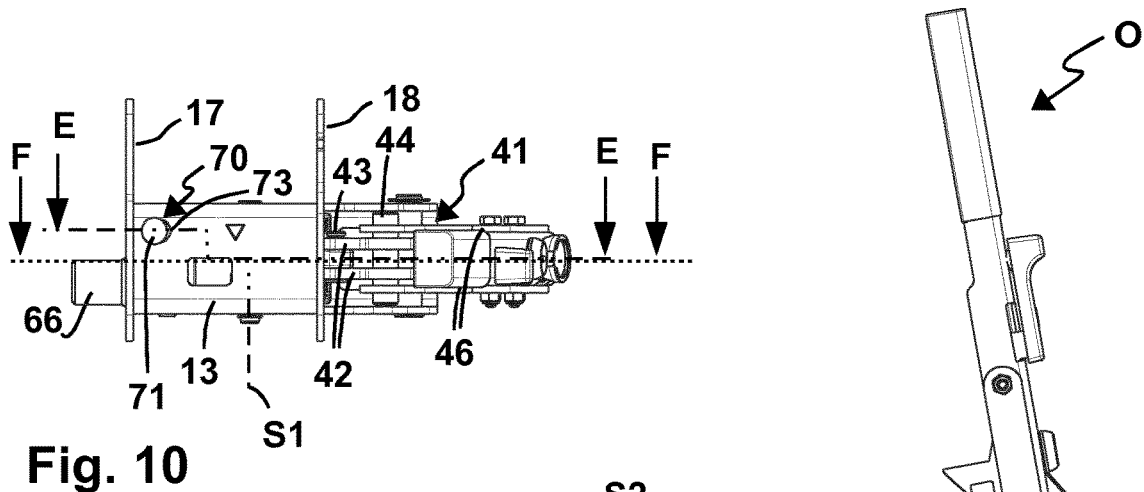
Figure 11:
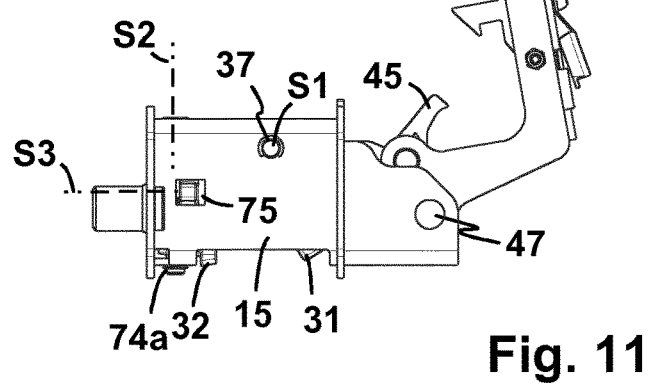

In the following, exemplary embodiments of the invention are described using the drawing. This shows as follows:

FIG. 1 a perspective oblique view from above of a rear load carrier with a load carrier coupling;

FIG. 2 the rear load carrier according to FIG. 1 obliquely from below;

FIG. 3 a perspective lateral oblique view of the load carrier coupling of the rear load carrier in its open position;

FIG. 4 the load carrier coupling according to FIG. 3 in clamping position;

FIG. 5 the load carrier coupling in open position in perspective lateral oblique view from a side opposite the view according to FIG. 3;

FIG. 6 the load carrier coupling according to FIG. 5, but in clamping position;

FIG. 7 a cross-section through the load carrier coupling according to the abovementioned figures and a trailer coupling, to which the load carrier coupling is to be secured, approximately along an intersecting line E-E in FIG. 10;

FIG. 8 a cross-section through the load carrier coupling in clamping position and the trailer coupling along an intersecting line F-F in FIG. 10;

FIG. 9 a perspective oblique view of the load carrier coupling corresponding approximately to FIG. 5, but with the base housing removed;

FIG. 10 a frontal view from above of the load carrier coupling according to the above figures; and FIG. 11 a frontal lateral view of the load carrier coupling from the same side as in FIG. 6.

A rear load carrier 9 is provided for arrangement on a back 101 of a schematically represented motor vehicle 100. To this end, the rear load carrier 9 has a load carrier coupling 10, that can be secured to a trailer coupling 90 of the motor vehicle 100. The trailer coupling 90 has, by way of example, a coupling arm 91, that protrudes rearwards from the back 101 of the motor vehicle 100, by way of example from a bumper of the motor vehicle 100.

A supporting base 80 of the rear load carrier 9 serves to carry a load, by way of example luggage or in the specific exemplary embodiment bicycles. The supporting base 80 comprises, by way of example, a carrying structure 81, secured to the load carrier coupling 10. The carrying structure 81 has side members 82, running in the longitudinal direction of the vehicle in the mounted state of the rear load carrier 9 on the motor vehicle 100. The side members 82 are joined together by a cross member 83, which for its part is in turn secured to the load carrier coupling 10.

On the side members 82 supporting elements 84, by way of example gutters, are arranged, into which a load, in particular bicycles, can be placed. By way of example, the supporting elements 84 can be adjusted between a use position shown in the drawing, in which they protrude laterally from the side members 82, and a non-use position using swivel bearings 85, in which the supporting elements 84 are arranged in an intermediate space between the side members 82. The rear load carrier 9 then takes up less space. On the supporting elements 84 fixings 86, by way of example flexible fixings, in particular belts, for securing a bicycle, in particular its wheels, are provided. Furthermore, the load, in particular a respective bicycle, can be secured using a support 87. The support 87 comprises, by way of example, a stirrup, which in the use position protrudes at an angle from the carrying structure 81 (shown in this way in the drawing), and which advantageously, when not in use, can still be adjusted in the direction of the carrying structure 81, in particular the side members 82. On the support 87, adjustable carrier arms (not shown in more detail) are provided for retaining a load, in particular a bicycle.

Between the side members 82 and opposite the cross member 83 a number plate holder 88 also extends, which connects the side members 82. On the number plate holder 88 lights 89 are arranged to provide rear lighting of the rear load carrier 9. The lights 89 can advantageously be swivelled using swivel bearings not shown in more detail between a use position approximately in alignment with the number plate holder 88 and a non-use position out of alignment with the side members 82.

The load carrier coupling 10 described in more detail in the following is advantageously suitable for securing the supporting base 80 to the motor vehicle 100. The load carrier coupling 10 could also, however, quite easily securely retain another supporting base, for example a trailer platform, in the manner described below, on the trailer coupling 90.

The load carrier coupling 10 comprises a base 11, connected to the supporting base 80. The base 11 could obviously also be configured as an integral part of the supporting base of a rear load carrier or as a supporting base.

The base housing 12 is advantageously substantially block shaped.

The base housing 12 has, for example, an upper side wall 13 and a lower side wall 14 opposite this (in each case in relation to the use position in the state of the load carrier coupling 10 when mounted on the motor vehicle 100), between which sidewalls 15 and 16 extend. On opposing end faces of the side walls 13-16, supporting walls 17 and 18 are provided, on each of which retaining projections 19 for the carrying structure 81 are present. By way of example, the retaining seats 20 on the cross member 83 are pushed onto the retaining projections 19.

Before the supporting wall 18 there is a mount projection 21, which is preferably integrally formed by the side walls 14-16. By way of example, these side walls 14-16 are pushed through corresponding push-through openings on the supporting wall 18 and represent a particularly stable construction.

This push together method is also used between the side walls 13-16 and the supporting walls 17 and 18 at another point. By way of example, the side walls 13-16, in particular the side wall 13, has plug-in projections 24, which are inserted in corresponding push-fit seats 23 in the supporting walls 17, 18, see by way of example FIG. 3 and FIG. 9. The plug-in projections 24 are integral parts of the side walls 13-16. The plug-in projections 24 advantageously protrude from their narrow side in the direction of the supporting walls 17, 18 like plug-in lugs.

By means of the side walls 13-16 and the supporting walls 17 and 18, the base 11 delimits a seat 25, thus an interior space, in which, by way of example, the clamping device 30 described in more detail below is arranged.

A coupling body 93 of the trailer coupling 90 can, by way of example, be pushed through a push-through opening 26 in the side wall 14 of the base housing 12, in order to be clamped in the interior space of the base housing 12 by the clamping device 30.

The coupling body 93 is, by way of example, arranged on a coupling arm 91, which extends rearwards from the back 101 of the motor vehicle 100. At the free end area of the coupling arm 91 a neck section 92 is provided, on which the coupling body 93, by way of example a coupling ball, is arranged.

The clamping device 30 is adjustable by an actuating device 40 between an open position O and a clamping position K. In the open position O clamping parts 31, 32 of the clamping device 30 are further apart from one another than in the clamping position K, so that the coupling body 93, in particular the coupling ball, can be introduced into an intermediate space between the clamping parts 31 and 32 or removed from this intermediate space again. In the clamping position K, on the other hand, the clamping parts 31, 32 are adjusted towards one another, so that they securely clamp the coupling body 93. Then the rear load carrier 9 is securely connected with the trailer coupling 90 and thus the motor vehicle 100, so that advantageously even heavy loads, in particular also electric bicycles or similar, can be safely transported.

The clamping parts 31, 32 in each case have a form-fitting seat 33 for form-fit seating of the coupling body 93. The form-fitting seats 33 are at least partly spherical segment shaped, to be able to retain the spherical coupling body 93 in a form-fitting and flush manner. The form-fitting seats 33 have, by way of example, spherical segment-shaped clamping areas 34 auf, extending around recesses 35. The coupling body 93 is inserted into the recesses 35 but has no contact there with the clamping parts 31, 32. The contact between coupling body 93 and the form-fitting seats 33 is preferably provided only in the clamping areas 34, which are correspondingly circular.

The neck section 92 of trailer coupling 90 is associated with securing sections 36 of the clamping parts 31,32, which extend away from the form-fitting seats 33. The securing sections 36 have, by way of example, cylindrical recesses, in which the neck section 92 has a form-fit. However, the securing sections 36 are configured such that, when the clamping areas 34 are clamped with the coupling body 93, in general they are not in contact with the neck section 92 of the coupling arm 91. Only if the clamping of the clamping device 30 is fully or partially released, by way of example if it is overloaded, in the event of an accident, or similar, and/or if the load carrier coupling 10 is not optimally adjusted, in particular the top dead centre tension is not correctly adjusted, do the securing sections 36 allow an additional form-fit retention of the load carrier coupling 10 on the coupling arm 91.

It is worth noting at this point, that the clamping parts 31, 32 are preferably approximately plate-like and/or form clamping bodies. The clamping parts 31, 32 are preferably formed as one-piece, correspondingly resilient, components. The clamping parts 31 are preferably made from metal, in particular steel, iron, aluminium or similar.

Now, it is conceivable that both clamping parts 31, 32 could be swivelled into the open position O or otherwise mounted movably on the base 11, in order in this way to, as it were, open up the intermediate space for inserting or removing the coupling body 93 between the clamping parts 31, 32.

However, in the exemplary embodiment only the clamping part 31 is the, as it were, active clamping part, which is operably mounted between the open position O and the clamping position K using the actuating device 40. By way of example, an axle member 38 is accommodated by the base 11, which defines a swivel axis S1, about which the clamping part 31 can swivel relative to the base 11. The orientation of the swivel axis S1 is preferably such that during use of the load carrier coupling 10 it runs approximately or precisely horizontally and/or approximately or precisely in the vehicle longitudinal direction of the motor vehicle 100. The swivel axis S1 expediently runs between the side walls 15 and 16. The swivel axis S1 runs more advantageously close to the top side wall 13.

The actuating device 40 is mounted on the mount projection 21 of the base 11. The actuating device 40 comprises a linkage arrangement 41 for actuating the clamping part 31 between the clamping position K and the open position O.

The linkage arrangement 41 comprises, by way of example, positioning elements 42, which by means of an axle member 43 are movably coupled to clamping part 31 so that they can rotate about a swivel axis B3. The axle member 43 penetrates by way of example a bearing seat 43a on the clamping part 31. The bearing seat 43a is, by way of example, provided on a mount projection protruding from the clamping part opposing the form-fitting seat 33. The positioning elements 42 are arranged next to one another at right-angles to the axle member 43 and/or running parallel, so that they form a functionally single member of the linkage arrangement 41.

The positioning elements 42 are coupled with an actuating lever 50 of the actuating device via an axle member 44 so that they can swivel about a swivel axis B2, which actuating device for its part by means of an axle member 47 is mounted on the base 11 so that it can swivel about a swivel axis B1. The axle member 47 is accommodated in bearing seats on bearing wall sections 22 of the mount projection 21 in particular so that it can swivel. For retention in the longitudinal direction of the swivel axis B1 on the base 11, the axle member 47, has a head 49 at one longitudinal end and a retaining ring 48 at the other longitudinal end. The head 49 and the retaining ring 48 are supported by outer sides of the bearing wall sections 22 turned away from one another.

Actuators 46 of operating element 50 extend between the axle members 47, 44 or between the swivel axes B1 and B2. The actuators 46 are, like the positioning elements 42, arranged in parallel next to one another and are penetrated by the axle members 47, 44. Functionally the actuators 46 accordingly also form a single actuator.

By way of example, the positioning elements 42 and the actuators 46 are implemented as sheet metal parts. In this connection, it is mentioned that the walls of the base housing 12 are advantageously configured as sheet metal parts.

The positioning elements 42 and the actuators 46 advantageously form a link chain.

When swivelling about the swivel axis B2, the positioning elements 42 and the actuators 46 reduce, in an angular position to one another, the distance between the swivel axes B1 and B3, wherein the clamping part 31 moves away from clamping part 32 and the open position O is reached. In doing so, the swivel axis B2 swivels well away from an axis V1 extending between the swivel axes B1 and B3. The abovementioned link chain of positioning elements 42 and actuators 46 adopts a kinked position.

The positioning elements 42 and actuators 46, on the other hand swivel in the direction of the clamping position K into a substantially floating position with respect to one another.

If the swivel axis B2 is located precisely along the centre line between the swivel axes B1 and B3, it adopts a top dead centre position. In order to take up a top dead centre position, the swivel axis B2 is, in the clamping position K, on one side of the connecting axis between the swivel axes B1 and B3 and, in the open position O, on the other side of such a connecting axis between the swivel axes B1 and B3.

The swivel axis B2 is located in the clamping position K just beyond an axis V2 extending between the swivel axes B1 and B3 in the clamping position K in a top dead centre position. This top dead centre position is defined by a top dead centre stop 45b, against which stop arms 45 of the positioning elements 42 strike in the top dead centre position or the clamping position K, see, by way of example, FIG. 4, FIG. 6 and FIG. 8. The stop arms 45 protrude in an axial extension of a section of the positioning elements 42 extending between the swivel axes B2 and B3.

Arms 54 extend at an angle from the actuators 46, approximately at an angle of 90°, in particular 80-110°. In turn, from the arms 54 connecting legs 55 extend at an angle, by way of example approximately at an angle of approximately 90°. Overall a configuration and angular position has been found such that the arms 54 and the connecting legs 55 in the clamping position K run approximately parallel to the supporting wall 18 and to the upper side wall 13.

Between the connecting legs 55 an actuating arm 51 of the actuating lever 50 is accommodated. The actuating arm 51 has a handle 53 for an operator to grip and an actuating section 52, which is retained between the connecting legs 55. By way of example, the connecting legs 55 are screwed, glued, riveted, or similar to the actuating section 52. In any case, the actuating arm 51, together with the actuators 46, forms the actuating lever 50, with which the positioning elements 42 can be operated.

By means of a locking device 56, the actuating device 40 can be locked in the clamping position K. The locking device 56 comprises a locking element 57 that is mounted so that it is able to displace along an axis R on the actuating arm 51. By way of example, 2 floating bearings 60 are provided. The floating bearings 60 comprise, by way of example, bearing projections 60a, which engage in bearing seats 60b on the locking element 57. The locking element 57 forms, by way of example, component that is mounted movably on the actuating lever 50 or the actuating arm 51.

The locking element 57 has an actuating section 58, which is easy to operate by a user on an outer perimeter of the actuating lever 50, in particular of the actuating arm 51, in order to bring a hook 59 (alternatively a locking pin or other projection from the element) projecting from the locking element 57 out of engagement with a hook receptacle 61 in the base 11. In the engaged position or locked position of the hook 59 in the hook receptacle 61, on the other hand, a spring 62 operates, which is preferably arranged on one of the floating bearings 60. The operator therefore operates the locking element 57 against the force of the spring 62 in the unlocking position, in which the hook 59 is moved out of the hook receptacle 61, so that the operator is able to swivel the hand-activated lever 50 about the swivel axis B1 and therefore operate the clamping device 30 in the direction of the open position O.

In the locking position, the locking element 57 is preferably lockable by a lock 63. The lock 63, by way of example, counteracts a sliding movement of the locking element 57 into the unlocking position or blocks this sliding movement along the axis R.

The clamping part 32 is mounted on the base 11 with movement play having several degrees of freedom of movement. However, for the clamping part 32, a stop surface 65 is provided against which the clamping part 32 sits in the clamping position K. The clamping part 32 is supported on the stop surface 65 by way of example by its rear side opposite the form-fitting seat 33.

The stop surface 65 is preferably a stop surface that is adjustable with respect to the base 11, wherein a stationary stop surface or one provided directly by the base 11 is similarly conceivable.

The stop surface 65 is provided on a stop element 66, by way of example a screw, which can be screwed into a thread 67 arranged in the base 11, in particular provided in the supporting wall 17. In the area of the stop element 66 a reinforcement 68 in the supporting wall 17 is expediently provided. The reinforcement 68 could, by way of example, be provided by a thread insert 64 on which the thread 67 is formed.

On the front, free end area of the screw, which forms the stop element 66, a support plate could be arranged, providing the stop surface 65.

The screw or the stop element 66 can, by way of example, be operated on a head 69, in order to screw the stop element into the thread 61 or unscrew it and thereby adjust the position of the stop surface 65 along an adjusting axis S3.

The clamping part 32 is mounted movably on the base 11 using a bearing arrangement 70. The bearing arrangement 70 comprises a swivel bearing 71 with a bearing bolt 72, which is accommodated in bearing seats 73 of the base 11. The bearing bolt 72 is accommodated in bearing seats 39 of the clamping part 32, by way of example non-rotatably. However, it is preferable or possible for the clamping part 32 to be able to swivel relative to the bearing bolt 72 about the longitudinal axis of this and/or to be mounted movably along its longitudinal axis. In this way, at least one degree of freedom of movement, preferably at least two degrees of freedom of movement, can be achieved.

The bearing seats 73 are provided on the upper and lower side wall 13, 14. A head 74 and a retaining ring 74a are provided at opposing longitudinal ends of the bearing bolt 72 and are supported by the side walls 13, 14 externally. In this way, the bearing bolt is captively retained on the base 11.

By means of the bearing bolt 72, the clamping part 32 is mounted so that it can swivel about a swivel axis S2 with respect to the base 11. Here, the bearing bolt 72 can, by way of example, rotate in the bearing seats 73. In this way a degree of freedom of movement, namely a degree of freedom of rotation, is created.

In addition, the bearing bolt 72 is mounted movably within the bearing seats 73 so that it can rotate about axes S4 and S5 at an angle to one another. By way of example, the bearing bolt 72 has a relatively large movement play along the axis S4, because the bearing seats 73 are configured as slotted holes. But the bearing bolt 72 also has movement play in the bearing seats 73, transversal to this axis S4, namely in the direction of axis S5. Furthermore, it is possible that between the head 74 and the retaining ring 74a a distance greater than the height of the base housing 12 is available, so that the bearing bolt 72 is movable further along the axis S2. In this case, then, a total of three degrees of translation along the axes S2, S4 and S5 are present, which are in each case at right-angles to one another.

The bearing arrangement 70 and the stop surface 65 are arranged on opposing sides of the clamping area 34 of the clamping part 32. The clamping range 34 therefore extends between the bearing arrangement 70 and the stop surface 65. If the coupling body 93 is clamped between the clamping parts 31, 32, it is supported by the clamping part 31, which is adjusted by the actuating device 40 in the direction of the clamping part 32. Here, the coupling body 93 on the one hand adopts an optimum position in the form-fitting seat 33 of the clamping part 31, and on the other it optimally aligns the clamping part 32 supported on the clamping part 31, so that it also comes to rest flush in the form-fitting seat 33 of the clamping part 32 in an optimum manner. The clamping part 32, by means of the movement play enabled by the bearing arrangement 70, can be adjusted with several degrees of freedom of movement, by way of example translationally along and rotating about the swivel axis S2 and/or along at least one of the adjusting axes S4 and/or S5, whereas the final portion of movement is adjusted in the direction of the clamping position K with respect to the stop surface 65, and is thus retained floating or movably in or on the base 11. In this way, an optimum clamping seat of the coupling body 93 between the clamping parts 31, 32 can be achieved.

However, the clamping part 32 can, and is only intended to be able to, move to a limited extent within or on the base 11, so that it cannot be adjusted into a position in relation to the other clamping part that makes inserting the coupling body 93 more difficult or prevents this. To this end, at a radial distance to the swivel axis S2 a seat 75 is provided, in which a projection 76 of the clamping part 32 engages. The seat 75 is, by way of example, provided on the side wall 15 of the base housing 12. However, in the seat 75 the clamping part 32 or its projection 76 has sufficient movement play in order, by way of example, to allow an adjustment of the clamping part 32 along the adjusting axis S3. Transversally to the adjusting axis S3 also, namely parallel to the adjusting axis S2, the projection 76 engages with play in the seat 75, so that the clamping part 32 in relation also to the adjusting axis S2 has a movement play or the abovementioned degree of freedom of movement.

The bearing seats 73 and/or the seat 75 preferably form in the clamping position K further stop surfaces for the clamping part 32. Through the coupling body 93 the clamping part 32 is on the one hand adjusted against the stop surface 65, and on the other in relation to the bearing seat 73 also brought into an open position or stop position.

The stop surface 65 can, not only in the exemplary embodiment, but also in other embodiments of the invention, have a relatively large area flat face. The stop surface 65 can in one form of the invention counteract a tilting or swivelling movement of the clamping part 32 about the swivel axis S2 in the sense of preventing this swivel movement. It is nevertheless possible for the clamping part 32 to swivel about the swivel axis S2. This can advantageously contribute to the clamping part 32, so to speak, with respect to base 11 being wedged or clamped, if it is impinged upon by force from the coupling body 93.

An exemplary embodiment of the invention not shown in the drawing can provide that the axle member 43, with at least two degrees of freedom of movement, by way of example a degree of freedom of translation and a degree of freedom of rotation, about the axis B3, is linked to the positioning element 42, so that the clamping part 31 in the final part of the movement path in the direction of the clamping position K can be aligned by the coupling body 93 relative to the other clamping part 31 and/or relative to the bearing seat, which is penetrated by the axle member 43 and thus constitutes a stop surface.

The invention claimed is:

1. A load carrier coupling for the releasable securing of a rear load carrier, which has a supporting base for placing a load thereon, on a coupling body, configured in particular as a coupling ball, of a motor vehicle trailer coupling, the load carrier coupling comprising: a base which forms the supporting base or is provided for holding the supporting base, wherein a clamping device comprising two clamping parts is arranged on the base and is adjustable by an actuating device between an open position provided for inserting the coupling body into an intermediate space between the clamping parts and for removing the coupling body from the intermediate space and a clamping position provided for clamping the coupling body, wherein the clamping parts are at a greater distance from each other in the open position for the insertion and removal of the coupling body than in the clamping position, wherein at least one of the clamping parts is mounted movably with respect to a stop surface using a bearing arrangement having at least two degrees of freedom of movement which differ from one another, and therefore said clamping part is adjustable by the coupling body, which is supported on the other clamping part, for alignment with the coupling body during a final portion of movement of the clamping device in order to take up the clamping position with respect to the stop surface, wherein the at least one stop surface and the bearing arrangement are arranged on a force transmission element of the actuating device.

2. A load carrier coupling according to claim 1, wherein the at least one stop surface comprises a stop surface arranged on an adjustable stop element for setting a distance between the clamping parts in the clamping position or comprises a stop surface that is stationary in relation to a component of the actuating device.

3. A load carrier coupling according to claim 1, wherein the at least one stop surface and the bearing arrangement are arranged on the base of the load carrier coupling and/or the actuating device.

4. A load carrier coupling according to claim 1, wherein the bearing arrangement and the at least one stop surface as well as the clamping part are supported by the bearing arrangement and are arranged on the base and the other clamping part is adjustable via the actuating device between the clamping position and the open position.

5. A load carrier coupling according to claim 1, wherein the at least two degrees of freedom of movement comprise at least two degrees of freedom of translation at an angle to one another, and/or at least one degree of freedom of translation and at least one degree of freedom of rotation and/or at least two degrees of freedom of rotation.

6. A load carrier coupling according to claim 1, wherein the clamping part supported on the at least one stop surface by the bearing arrangement is mounted to swivel about a swivel axis and to slide along a sliding axis.

7. A load carrier coupling according to claim 1, wherein the bearing arrangement comprises a combined swivel bearing and sliding bearing, wherein the at least one clamping part is swivelled about a swivel axis running through a swivel axis part and the swivel axis part is accommodated in a bearing seat able to slide along a sliding axis.

8. A load carrier coupling according to claim 1, wherein the at least one stop surface comprises a bearing surface arranged on a bearing seat of the bearing arrangement.

9. A load carrier coupling according to claim 1, wherein at least one of the clamping parts is operable by the actuating device and is mounted so that it can be swivelled about a swivel axis between the open position and the clamping position of the clamping device.

10. A load carrier coupling according to claim 1, wherein a swivel axis of the bearing arrangement, about which clamping part is able to swivel with respect to the stop surface can swivel, is at an angle, to a swivel axis, about which the other clamping part is able to swivel between the open position and the clamping position of the clamping device.

11. A load carrier coupling according to claim 1, wherein the actuating device has a top dead centre gear and/or a linkage arrangement and/or an actuating lever.

12. A load carrier coupling according to claim 1, wherein the actuating device has a linkage arrangement, which holds at least one clamping part in the clamping position in a top dead centre position, wherein the linkage arrangement has at least one top dead centre stop which a movable limit stop projection of a link element of the linkage arrangement in the top dead centre position strikes during adjustment of the clamping part from the open position into the clamping position.

13. A load carrier coupling according to claim 1, wherein at least one of the clamping parts has a form-fitting seat, for form-fit seating of the coupling body.

14. A load carrier coupling according to claim 1, wherein a clamping surface of the clamping part alignable by the coupling body is arranged between the bearing arrangement and the at least one stop surface, and/or the at least one stop surface and the bearing arrangement are arranged on opposing areas of the clamping part.

15. A load carrier coupling according claim 1, wherein the base of the load carrier coupling comprises a base housing formed using stamped and bent parts or stamped parts and/or that the at least one clamping part adjustable with respect to at least stop surface is mounted floatingly using the bearing arrangement on the base or the actuating device and/or the at least one clamping part alignable by the coupling body is mounted on an opposing side of its clamping surface with respect to base and/or the clamping part alignable by the coupling body is mounted movably by the bearing arrangement and away from the bearing arrangement in engagement with the base or the actuating device, so that it is captive with respect to base or the actuating device or a movement path of the clamping part towards the other clamping part is restricted and/or it forms a component of a rear load carrier.

16. A rear load carrier with a load carrier coupling according to claim 1.

17. A load carrier coupling according to claim 1, wherein the at least one stop surface comprises a stop surface arranged on an adjustable stop element for setting a distance between the clamping parts in the clamping position and is stationary in relation to a component of the actuating device.

18. A load carrier coupling according to claim 1, wherein the at least two degrees of freedom of movement comprise at least two degrees of freedom of translation at a right-angle.

19. A load carrier coupling according to claim 1, wherein the at least one stop surface comprises a slotted hole of the bearing arrangement.

20. A load carrier coupling according to claim 1, wherein a swivel axis of the bearing arrangement, about which clamping part is able to swivel with respect to the stop surface can swivel, is approximately at a right-angle, to a swivel axis, about which the other clamping part is able to swivel between the open position and the clamping position of the clamping device.

21. A load carrier coupling according to claim 1, wherein the actuating device has a linkage arrangement, which holds at least one clamping part in the clamping position in a top dead centre position, wherein the linkage arrangement has at least one top dead centre stop in a form of an axis element, which a movable limit stop projection of a link element of the linkage arrangement in the top dead centre position strikes during adjustment of the clamping part from the open position into the clamping position.

22. A load carrier coupling according to claim 1, wherein at least one of the clamping parts has a form-fitting seat having a spherical ball-shaped and/or circular clamping surface for form-fit seating of the coupling body.

23. A load carrier coupling according to claim 1, wherein a clamping surface of the clamping part alignable by the coupling body is arranged between the bearing arrangement and the stop element having the stop surface.

24. A load carrier coupling for the releasable securing of a rear load carrier, which has a supporting base for placing a load thereon, on a coupling body, configured in particular as a coupling ball, of a motor vehicle trailer coupling, the load carrier coupling comprising: a base which forms the supporting base or is provided for holding the supporting base, wherein a clamping device comprising two clamping parts is arranged on the base and is adjustable by an actuating device between an open position provided for inserting the coupling body into an intermediate space between the clamping parts and for removing the coupling body from the intermediate space and a clamping position provided for clamping the coupling body, wherein the clamping parts are at a greater distance from each other in the open position for the insertion and removal of the coupling body than in the clamping position, wherein at least one of the clamping parts is mounted movably with respect to a stop surface using a bearing arrangement having at least two degrees of freedom of movement which differ from one another, and therefore said clamping part is adjustable by the coupling body, which is supported on the other clamping part, for alignment with the coupling body during a final portion of movement of the clamping device in order to take up the clamping position with respect to the stop surface wherein a swivel axis of the bearing arrangement, about which clamping part is able to swivel with respect to the stop surface can swivel, is at an angle, to a swivel axis, about which the other clamping part is able to swivel between the open position and the clamping position of the clamping device.

25. A load carrier coupling for the releasable securing of a rear load carrier, which has a supporting base for placing a load thereon, on a coupling body, configured in particular as a coupling ball, of a motor vehicle trailer coupling, the load carrier coupling comprising: a base which forms the supporting base or is provided for holding the supporting base, wherein a clamping device comprising two clamping parts is arranged on the base and is adjustable by an actuating device between an open position provided for inserting the coupling body into an intermediate space between the clamping parts and for removing the coupling body from the intermediate space and a clamping position provided for clamping the coupling body, wherein the clamping parts are at a greater distance from each other in the open position for the insertion and removal of the coupling body than in the clamping position, wherein at least one of the clamping parts is mounted movably with respect to a stop surface using a bearing arrangement having at least two degrees of freedom of movement which differ from one another, and therefore said clamping part is adjustable by the coupling body, which is supported on the other clamping part, for alignment with the coupling body during a final portion of movement of the clamping device in order to take up the clamping position with respect to the stop surface, wherein the actuating device has a linkage arrangement, which holds at least one clamping part in the clamping position in a top dead centre position, wherein the linkage arrangement has at least one top dead centre stop which a movable limit stop projection of a link element of the linkage arrangement in the top dead centre position strikes during adjustment of the clamping part from the open position into the clamping position.

26. A load carrier coupling for the releasable securing of a rear load carrier, which has a supporting base for placing a load thereon, on a coupling body, configured in particular as a coupling ball, of a motor vehicle trailer coupling, the load carrier coupling comprising: a base which forms the supporting base or is provided for holding the supporting base, wherein a clamping device comprising two clamping parts is arranged on the base and is adjustable by an actuating device between an open position provided for inserting the coupling body into an intermediate space between the clamping parts and for removing the coupling body from the intermediate space and a clamping position provided for clamping the coupling body, wherein the clamping parts are at a greater distance from each other in the open position for the insertion and removal of the coupling body than in the clamping position, wherein at least one of the clamping parts is mounted movably with respect to a stop surface using a bearing arrangement having at least two degrees of freedom of movement which differ from one another, and therefore said clamping part is adjustable by the coupling body, which is supported on the other clamping part, for alignment with the coupling body during a final portion of movement of the clamping device in order to take up the clamping position with respect to the stop surface wherein the at least two degrees of freedom of movement comprise at least two degrees of freedom of translation at a right-angle.

27. A load carrier coupling for the releasable securing of a rear load carrier, which has a supporting base for placing a load thereon, on a coupling body, configured in particular as a coupling ball, of a motor vehicle trailer coupling, the load carrier coupling comprising: a base which forms the supporting base or is provided for holding the supporting base, wherein a clamping device comprising two clamping parts is arranged on the base and is adjustable by an actuating device between an open position provided for inserting the coupling body into an intermediate space between the clamping parts and for removing the coupling body from the intermediate space and a clamping position provided for clamping the coupling body, wherein the clamping parts are at a greater distance from each other in the open position for the insertion and removal of the coupling body than in the clamping position, wherein at least one of the clamping parts is mounted movably with respect to a stop surface using a bearing arrangement having at least two degrees of freedom of movement which differ from one another, and therefore said clamping part is adjustable by the coupling body, which is supported on the other clamping part, for alignment with the coupling body during a final portion of movement of the clamping device in order to take up the clamping position with respect to the stop surface wherein a swivel axis of the bearing arrangement, about which clamping part is able to swivel with respect to the stop surface can swivel, is approximately at a right-angle, to a swivel axis, about which the other clamping part is able to swivel between the open position and the clamping position of the clamping device.

28. A load carrier coupling for the releasable securing of a rear load carrier, which has a supporting base for placing a load thereon, on a coupling body, configured in particular as a coupling ball, of a motor vehicle trailer coupling, the load carrier coupling comprising: a base which forms the supporting base or is provided for holding the supporting base, wherein a clamping device comprising two clamping parts is arranged on the base and is adjustable by an actuating device between an open position provided for inserting the coupling body into an intermediate space between the clamping parts and for removing the coupling body from the intermediate space and a clamping position provided for clamping the coupling body, wherein the clamping parts are at a greater distance from each other in the open position for the insertion and removal of the coupling body than in the clamping position, wherein at least one of the clamping parts is mounted movably with respect to a stop surface using a bearing arrangement having at least two degrees of freedom of movement which differ from one another, and therefore said clamping part is adjustable by the coupling body, which is supported on the other clamping part, for alignment with the coupling body during a final portion of movement of the clamping device in order to take up the clamping position with respect to the stop surface wherein the actuating device has a linkage arrangement, which holds at least one clamping part in the clamping position in a top dead centre position, wherein the linkage arrangement has at least one top dead centre stop in a form of an axis element, which a movable limit stop projection of a link element of the linkage arrangement in the top dead centre position strikes during adjustment of the clamping part from the open position into the clamping position.

\* \* \* \* \*